United States Patent
Abraham et al.

(10) Patent No.: US 9,661,445 B2
(45) Date of Patent: May 23, 2017

(54) METHODS AND APPARATUS FOR INTEGRATING BLUETOOTH DEVICES INTO NEIGHBOR AWARE NETWORKS

(71) Applicant: QUALCOMM Incorporated, San Diego, CA (US)

(72) Inventors: Santosh Paul Abraham, San Diego, CA (US); George Cherian, San Diego, CA (US); Abhishek Pramod Patil, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/698,610

(22) Filed: Apr. 28, 2015

(65) Prior Publication Data

US 2015/0319029 A1 Nov. 5, 2015

Related U.S. Application Data

(60) Provisional application No. 61/987,794, filed on May 2, 2014.

(51) Int. Cl.
*H04J 3/16* (2006.01)
*H04W 4/00* (2009.01)
(Continued)

(52) U.S. Cl.
CPC ....... *H04W 4/008* (2013.01); *H04L 29/08423* (2013.01); *H04L 61/2592* (2013.01);
(Continued)

(58) Field of Classification Search
CPC .............................. H04W 8/005; H04W 48/16
(Continued)

(56) References Cited

U.S. PATENT DOCUMENTS 7,613,426 B2 * 11/2009 Kuehnel ................. H04W 4/00
370/395.1
8,554,915 B2 * 10/2013 Famolari ........... H04L 29/12009
709/226
(Continued)

FOREIGN PATENT DOCUMENTS

EP 1865687 A1 12/2007

OTHER PUBLICATIONS

Anonymous: "What is UPnP? UPnP Forum", UPnP forum, May 21, 2007 (May 21, 2007), XP055201738, Retrieved from the Internet: URL:http://upnp.org/about/what-is-upnp/ [retrieved on Jul. 10, 2015].
(Continued)

*Primary Examiner* — Ricky Ngo
*Assistant Examiner* — Dewanda Samuel
(74) *Attorney, Agent, or Firm* — Knobbe Martens Olson & Bear LLP

(57) ABSTRACT

Methods and apparatus for integrating Bluetooth devices into neighbor aware networks are described herein. In some aspects, a method for wireless communication may comprise receiving at least one parameter indicating availability of a service associated with a first wireless protocol from a first wireless device configured to communicate according to the first wireless protocol. The method may further comprise encapsulating the at least one parameter into a service discovery frame associated with a second wireless protocol. The method may further comprise transmitting the service discovery frame to a second wireless device configured to communicate according to the second wireless protocol. The first wireless network comprises a Bluetooth protocol and the second wireless network comprises a WiFi protocol.

26 Claims, 6 Drawing Sheets

(51) Int. Cl.
    *H04L 29/08*     (2006.01)
    *H04W 76/02*     (2009.01)
    *H04L 29/12*     (2006.01)
    *H04W 4/08*     (2009.01)
    *H04W 8/00*     (2009.01)
    *H04W 84/18*     (2009.01)
    *H04W 48/16*     (2009.01)
    *H04W 88/06*     (2009.01)

(52) U.S. Cl.
    CPC ............... *H04L 67/16* (2013.01); *H04W 4/08* (2013.01); *H04W 8/005* (2013.01); *H04W 76/023* (2013.01); *H04W 48/16* (2013.01); *H04W 84/18* (2013.01); *H04W 88/06* (2013.01)

(58) Field of Classification Search
    USPC .................................................. 370/338, 463
    See application file for complete search history.

(56) References Cited

U.S. PATENT DOCUMENTS

| | | | | |
|---|---|---|---|---|
| 2004/0267876 A1* | 12/2004 | Kakivaya | ................ | H04L 67/16 709/200 |
| 2005/0267952 A1* | 12/2005 | Ricciardi | ................ | H04L 67/16 709/220 |
| 2007/0197214 A1* | 8/2007 | Faccin | ................ | H04L 12/4633 455/433 |
| 2008/0175213 A1 | 7/2008 | Hansen | | |
| 2009/0046657 A1* | 2/2009 | Kim | .................... | H04W 36/005 370/331 |
| 2009/0274173 A1* | 11/2009 | Wentink | .................. | H04L 69/22 370/474 |
| 2014/0269555 A1* | 9/2014 | Sadasivam | ........ | H04W 72/0406 370/329 |

OTHER PUBLICATIONS

International Search Report and Written Opinion—PCT/US2015/028290—ISA/EPO—Jul. 20, 2015.

Jo T K., et al., "A bluetooth-UPnP bridge for the wearable computing environment", IEEE Transactions on Consumer Electronics, IEEE Service Center, New York, NY, US, vol. 54, No. 3, Aug. 1, 2008 (Aug. 1, 2008), pp. 1200-1205, XP011235567, ISSN: 0098-3063.

* cited by examiner

METHODS AND APPARATUS FOR INTEGRATING BLUETOOTH DEVICES INTO NEIGHBOR AWARE NETWORKS

CLAIM OF PRIORITY UNDER 35 U.S.C. §119

The present Application for patent claims priority to Provisional Application No. 61/987,794 entitled "METHODS AND APPARATUS FOR INTEGRATING BLUETOOTH DEVICES INTO NEIGHBOR AWARE NETWORKS" filed May 2, 2014, and assigned to the assignee hereof. Provisional Application No. 61/987,794 is hereby expressly incorporated by reference herein.

BACKGROUND

Field

The present application relates generally to wireless communications, and more specifically to methods and apparatuses for integrating Bluetooth devices into neighbor aware networks.

Background

In wireless communications, a popular peer-to-peer exchange protocol is Bluetooth. However, Bluetooth communications can be limited to particularly short distances and, in some circumstances, barriers such as walls can further limit the range and quality of the communications. By contrast, users of certain other wireless communication protocols, such as WiFi, enjoy both increased ranges of communication as well as reduced interference from such barriers. Where wireless communication networks (e.g., WiFi networks) do not include an associated, centralized access point (AP) for traffic scheduling, nearby compatible devices may dynamically communicate with one another in an ad hoc fashion. Such networks may be called neighbor aware networks (NAN). However, WiFi devices and Bluetooth devices do not communicate utilizing the same protocols, so Bluetooth-only-compatible devices may be limited in the above-described manner. In this context, there remains a need for methods and apparatuses for integrating Bluetooth devices into NANs.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

One aspect of this disclosure provides a method of wireless communication. The method comprises receiving at least one parameter indicating availability of a service associated with a first wireless protocol from a first wireless device configured to communicate according to the first wireless protocol. The method further comprises encapsulating the at least one parameter into a service discovery frame associated with a second wireless protocol. The method further comprises transmitting the service discovery frame to a second wireless device configured to communicate according to the second wireless protocol.

Another aspect of this disclosure provides an apparatus for wireless communication. The apparatus comprises a receiver configured to receive at least one parameter indicating availability of a service associated with a first wireless protocol from a first wireless device configured to communicate according to the first wireless protocol. The apparatus further comprises a processor configured to encapsulate the at least one parameter into a service discovery frame associated with a second wireless protocol. The apparatus further comprises a transmitter configured to transmit the service discovery frame to a second wireless device configured to communicate according to the second wireless protocol.

Another aspect of this disclosure provides a non-transitory computer-readable medium comprising code that, when executed, causes an apparatus to receive at least one parameter indicating availability of a service associated with a first wireless protocol from a first wireless device configured to communicate according to the first wireless protocol. The code, when executed, further causes the apparatus to encapsulate the at least one parameter into a service discovery frame associated with a second wireless protocol. The code, when executed, further causes the apparatus to transmit the service discovery frame to a second wireless device configured to communicate according to the second wireless protocol.

Another aspect of this disclosure provides an apparatus for wireless communication. The apparatus comprises means for receiving at least one parameter indicating availability of a service associated with a first wireless protocol from a first wireless device configured to communicate according to the first wireless protocol. The apparatus further comprises means for encapsulating the at least one parameter into a service discovery frame associated with a second wireless protocol. The apparatus further comprises means for transmitting the service discovery frame to a second wireless device configured to communicate according to the second wireless protocol.

DETAILED DESCRIPTION

Figure 1:
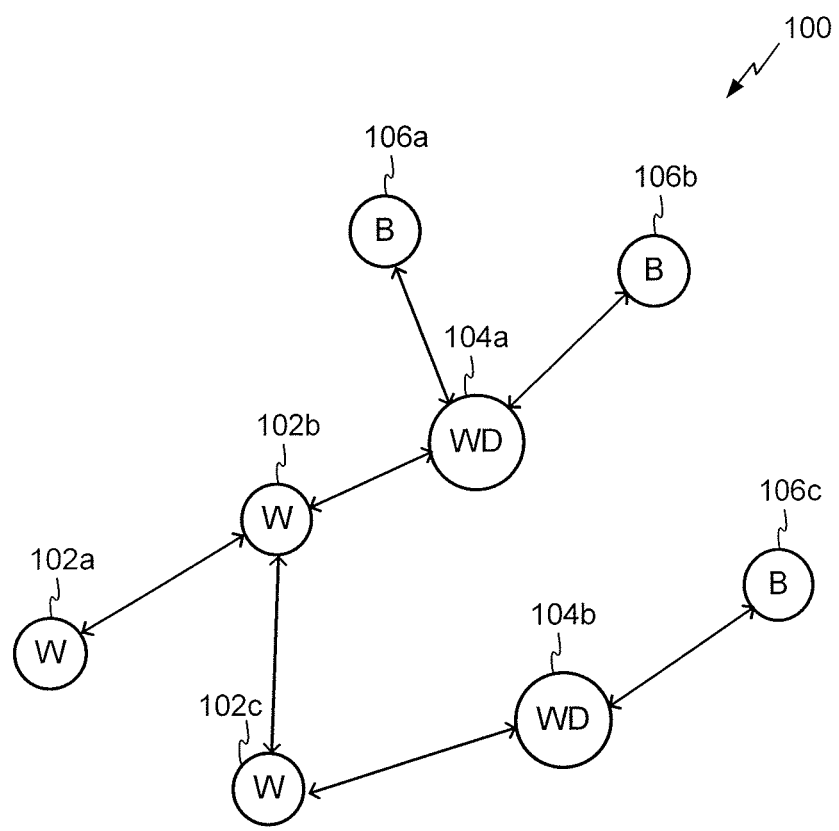
FIG. 1 shows an exemplary wireless neighbor aware network in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). An AP may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, a wireless device, a wireless node, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah or 802.11ac) compliant wireless link to obtain general connectivity to the Internet, to other wide area networks, or directly to another WiFi-compatible device. In such networks where an AP serves as a base station for the WLAN, all devices associated with that particular AP are associated with a corresponding basic service set ("BSS"). Contrarily, where one or more devices are not associated with a particular AP, those devices may be considered outside the BSS and part of an independent basic service set ("IBSS"). Where a device is a part of an IBSS, the device may communication with one or more other devices in a NAN.

FIG. 1 shows an exemplary wireless neighbor aware network 100 in which aspects of the present disclosure may be employed. The NAN 100 may generally operate pursuant to a wireless standard (e.g., via WiFi, 802.11ah or 802.11ac). However, as will be described in more detail below, the NAN 100 may also include devices that are not configured to communicate via WiFi and instead are configured to communicate via another wireless communication protocol (e.g., Bluetooth protocol). The NAN 100 may include one or more STAs configured to communicate utilizing WiFi protocols (e.g., WiFi STAs 102a, 102b and 102c). The NAN 100 may additionally include one or more STAs configured to communicate utilizing both WiFi and Bluetooth communication protocols (e.g., WiFi/Bluetooth (WB) STAs 104a and 104b). Each of the WiFi STAs 102a-102c and the WB STAs 104a-104b may have NAN-based communication capabilities. The NAN 100 may further comprise one or more STAs configured to communicate utilizing Bluetooth communication protocols (e.g., Bluetooth (BT) STAs 106a, 106b and 106c). Accordingly, the wireless connections between any of the WiFi STAs 102a-102c and/or between any of the WB STAs 104a-104b may comprise WiFi-based connections. Similarly, the wireless connections between any of the BT STAs 106a-106c and/or the WB STAs 104a-104b may comprise Bluetooth-based connections. Although a certain number of each type of STA is shown in FIG. 1, the present application is not so limited and any number of each type of STA may participate in the NAN 100 of FIG. 1.

The present application contemplates extending current WiFi NAN discovery to include Bluetooth devices and services. For example, as shown in FIG. 1, the WB STAs 104a-104b may act as a bridge or relay between one or more of the BT STAs 106a-106c and one or more of the WiFi STAs 102a-102c, since the BT STAs and the WiFi STAs utilize different communication protocols and are not configured to directly communicate with one another. In addition, the WB STAs 104a-104b may act as a bridge between any two or more of the BT STAs 106a-106c. Because WiFi communications may offer higher signal quality communications over greater distances than purely Bluetooth communications, utilizing the WB STAs 106a-106c as a bridge may additionally improve the availability range of the BT STAs 106a-106c Advertising Bluetooth Services Over a WiFi NAN In the NAN 100, any of the BT STAs 106a-106c may advertise available services utilizing a native Bluetooth service discovery protocol and transmit the advertisement utilizing one or more Bluetooth-specific communication mechanisms, such as iBeacon, for example. Such service advertisements may also provide information including but not limited to whether a particular service may be available over the NAN 100. One or more of the WB STAs 104a-104b may receive service advertisements from the BT STAs 106a-106c within range. Upon receiving the service advertisement(s) transmitted according to the Bluetooth service discovery protocol, the one or more WB STAs 104a-104b may insert or encapsulate the Bluetooth service descriptors into one or more NAN service discovery frames for subsequent transmission according to one or more WiFi protocols. For example, the one or more NAN service discovery frames may include a service description attribute comprising one or more fields as described in Table 1 below. In some implementations, the WB STAs 104a-104b may include a service identification field (service ID field) in the service description attribute indicating that services are available over Bluetooth. The WB STAs 104a-104b may also insert a description of the available service (e.g., whether the service is provided by a keyboard, a mouse, a speaker, a sensor, a monitor or display, etc.) in a separate service info field of the service description attribute. In some other implementations, the particular service name (e.g., service description) of the Bluetooth service may be hashed to produce a 6 byte value corresponding to the particular Bluetooth service for insertion into the above-mentioned service ID field. A device identifier (e.g., address) of the BT STA 106a-106c sending the service advertisement may additionally be included in the service advertisement for notifying the receiving WB STA 104a-140b (e.g., bridging WB STA) which BT STA to route associated communications and/or traffic to. A functional block diagram of an apparatus for integrating Bluetooth devices into NANs, as described above, may be described in more detail below in connection with FIG. 3.

In yet other implementations, the Bluetooth service ID may be tunneled utilizing the NAN 100. For example, rather than including the service description in the service info field of the service description attribute, an entirely new encapsulation information element (IE) may be defined and an indication associated with the Bluetooth service may be inserted into the new encapsulation IE. A functional block diagram of an apparatus for integrating Bluetooth devices into NANs in this way may be described in more detail below in connection with FIG. 4.

TABLE 1

| Field | Size (octets) | Value (Hex) | Description |
|---|---|---|---|
| Attribute ID | 1 | 0x03 | Identifies the type of NAN attribute |
| Length | 2 | Variable | Length of the following fields in the attribute. |
| Service ID | 6 | Variable | Set to a hash of generic "Bluetooth service" or hash of particular service name, or a Bluetooth profile name, e.g., Bluetooth Speaker |
| Instance ID | 1 | Variable | Publish_ID and/or Subscribe_ID |
| Requestor Instance ID | 1 | Variable | Instance ID from the frame that triggered the transmission if available, otherwise set to 0x00 |
| Service Control | 1 | Variable | Mandatory field that defines the Service Control Bitmap |
| Binding Bitmap | 2 | 0x000 to 0xFFFF | Binding bitmap may indicate the availability of the Bluetooth interface or other WiFi interface that can provide a post discovery data path for the Bluetooth service |
| Matching Filter | 1 | Variable | An optional field and present if a matching service discovery filter |

TABLE 1-continued

| Field | Size (octets) | Value (Hex) | Description |
|---|---|---|---|
| Length Matching Filter | Variable | Variable | is used May not be needed |
| Service Response Filter Length | 1 | Variable | An optional field and present if a service response filter is used |
| Service Response Filter | Variable | Variable | An optional field that is a sequence of length and value pairs that identify the matching service response filters |
| Service Info Length | 1 | Variable | An optional field and present if service specific information is used |
| Service Info | Variable | Variable | Indicate details of the Bluetooth service if needed |

Service Discovery

How the WB STAs 104a-104b operate during service discovery may depend upon whether the particular WB STA is already subscribed to a NAN, such as the NAN 100. For example, where the WB STAs 104a-104b are not yet subscribed to a NAN, the WB STAs 104a-104b may transmit an unsolicited NAN broadcast message via WiFi utilizing 802.11-based data frames including the service discovery frames, as described above, indicating the Bluetooth services offered by the WB STAs 104a-104b themselves, as well as the indicated Bluetooth services offered by one or more of the BT STAs 106a-106c within range.

In another example, where the WB STAs 104a-104b are already subscribed to a particular NAN, the WB STAs 104a-104b may cache indicated services offered by one or more of the BT STAs 106a-106c for a predetermined period of time (e.g., a timeout period). Upon receiving one or more queries for services from other STAs in the NAN through subscribe messages, the WB STAs 104a-104b may transmit the service descriptor attributes as previously described. Additionally or alternatively, where a particular WB STA 104a-104b has not previously received an indication for a particular Bluetooth service (e.g., a particular service indication is not currently being cached by the WB STA 104a-104b) the WB STA 104a-104b may trigger a search or discovery protocol for the BT STAs 106a-106c offering the particular Bluetooth service based on a received subscribe message for the particular Bluetooth service from another STA in the NAN 100.

Post-Discovery Data Paths Over WiFi for Bluetooth Services

Since one or more of the WB STAs 104a-104b may provide the NAN discovery for Bluetooth services provided by or for one or more of the BT STAs 106a-106c, those same WB STAs 104a-104b may also provide the data path to and from the one or more BT STAs 106a-106c for providing or receiving those services. In some implementations, a newly defined logical link control header (LLC header) or standard network access protocol header (SNAP header) protocol ID may be prepended to data packets of the service to indicate a particular destination BT STA 106a-106c before transmitting the data packets over WiFi. The Bluetooth device-bound data packets may then be transmitted in 802.11-based data frames via WiFi direct, via a basic service set (BSS) WiFi interface, via an independent BSS (IBSS) WiFi interface, or via a WiFi mesh interface, for example, depending on the WiFi architecture between the source and sink devices. The particular interface to be utilized for post-discovery data transmission may be indicated in a binding bitmap field included in the service discovery attribute, as described above in connection with Table 1. In addition, an availability time for the interface may be indicated in the particular interface attribute. In some implementations, where a particular service requires a Bluetooth interface for delivery, the availability time for the Bluetooth interface may be indicated in a new Bluetooth attribute.

In some implementations, where a WiFi mesh interface topology is used to route data to one or more of the BT STAs 106a-106c, the MAC address of the bridging WB STA may be used to route the data to the BT STA. Thus, the service discovery attribute that carries the Bluetooth-based service indicates the WiFi interface over which access to the BT service is available.

Discovering a NAN and NAN Services Over Bluetooth

In certain circumstances, it may be useful or desirable to have NAN clusters discoverable over Bluetooth (BT) or Bluetooth Low Energy (BTLE) interfaces. In this way the lower power BT/BTLE discovery may be leveraged. Here, the parameters of the NAN cluster may be transmitted over the Bluetooth link from the WB STAs 104a-104b to the BT STAs 106a-106c. However, due to the low data capacity of BT/BTLE interfaces, a set of key NAN parameters may need to be compressed before communication over the BT/BTLE interface. Exemplary parameters that may be indicated in such a compressed set of NAN parameters may include a Cluster Identifier (which may be a low byte hash associated with the NAN cluster), a discovery window transmission time, and an Anchor Master Rank (which may be used to rate the strength, reliability or desirability of a particular data path through the NAN in the case of data path merge decisions). Such parameters may be carried in a Bluetooth frame to the appropriate BT STAs 106a-106c.

Figure 2:
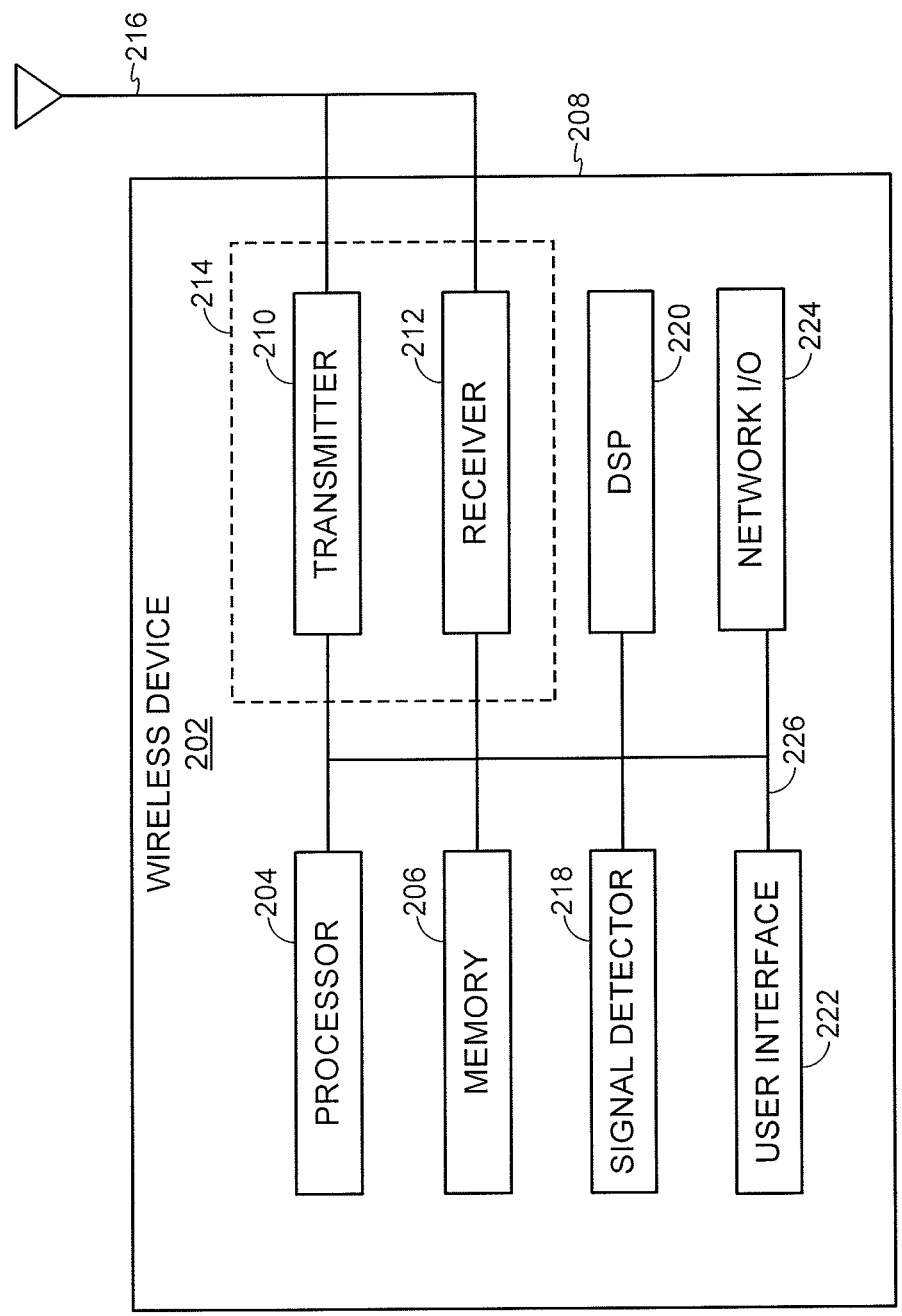
FIG. 2 shows an exemplary functional block diagram of an exemplary wireless device that may be employed within the wireless neighbor aware network of FIG. 1.

FIG. 2 shows an exemplary functional block diagram of a wireless device 202 that may be employed within the NAN 100 of FIG. 1. The wireless device 202 is an example of a device that may be configured to implement the various methods described herein. For example, the wireless device 202 may comprise any of the WB STAs 104b-104b. illustrated in FIG. 1, or variations thereof.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used to detect and quantify the level of signals received by the transceiver 214. The signal detector 218 may detect such signals such as, for example, total energy, energy per subcarrier per symbol, power spectral density and other signals. Certain aspects contemplate the signal detector 218 being used by software running on the memory 206 and the processor 204 to detect the presence of a transmitter or receiver. The wireless device 202 may also include a digital signal processor (DSP) 220 for use in processing signals. The DSP 220 may be configured to generate a packet for transmission. In some aspects, the packet may comprise a physical layer data unit (PPDU) or the like.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
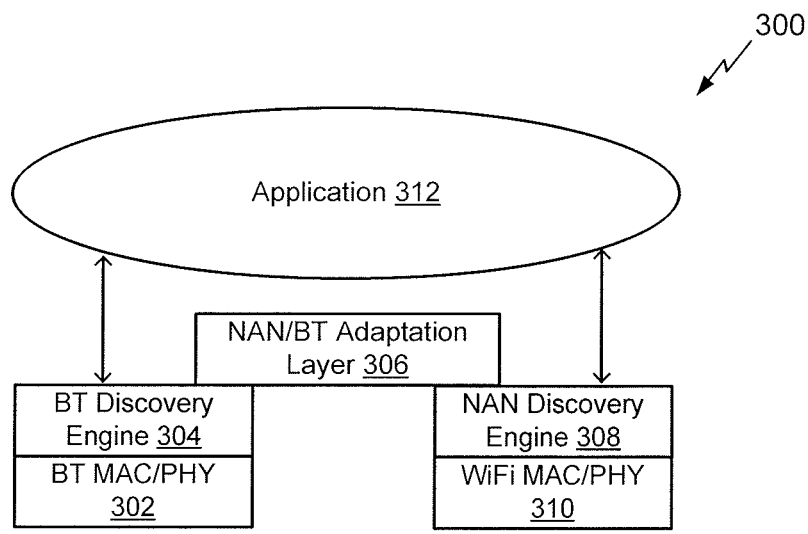
FIG. 3 shows an exemplary functional block diagram of an apparatus for integrating Bluetooth devices into neighbor aware networks, in accordance with an implementation.

FIG. 3 shows an exemplary functional block diagram of an apparatus 300 for integrating Bluetooth devices into neighbor aware networks, in accordance with an implementation. The apparatus 300 may correspond to the wireless device 200 of FIG. 2 and/or any of the WB STAs 104a-104b of FIG. 1, and may be configured to perform one or more of the actions previously described in connection with FIG. 1 and as will be described in more detail in connection with FIGS. 5-7 below. The apparatus 300 may comprise a Bluetooth media access control (MAC) layer and physical (PHY) layer module 302. The PHY layer portion may be a standard PHY layer, performing tasks such as character encoding/decoding, transmission and reception of Bluetooth data. The MAC layer portion may be a standard MAC layer, performing tasks such as error detection, control of access to the Bluetooth medium, frame delimiting and recognition and addressing of destination Bluetooth devices.

The apparatus 300 may additionally comprise a Bluetooth Discovery Engine 304, which may provide functionality associated with discovering other Bluetooth devices within range of the apparatus 300. The apparatus 300 may additionally comprise a WiFi MAC/PHY layer module 310. The PHY layer portion may be a standard PHY layer, performing tasks such as character encoding/decoding, transmission and reception of WiFi data. The MAC layer portion may be a standard MAC layer, performing tasks such as error detection, control of access to the WiFi medium, frame delimiting and recognition and addressing of destination WiFi devices. The apparatus 300 may additionally comprise an application 312, which may be configured to monitor and control processes associated with any of the previously mentioned modules or features of the apparatus 300. As shown, since the application 312 is configured to separately communicate with the BT portion (BT Discovery Engine 304 and BT MAC/PHY 302) and the NAN portion (NAN Discovery Engine 308 and NAN MAC/PHY 310), the application 312 operates with an awareness of the MAC/PHY layers for both of the BT and NAN portions. The apparatus 300 may additionally comprise a NAN/BT adaptation layer 306, which may be configured to adapt and/or repackage communications received from the Bluetooth medium for retransmission over the WiFi medium, or vice versa, as previously described in connection with FIG. 1.

Figure 4:
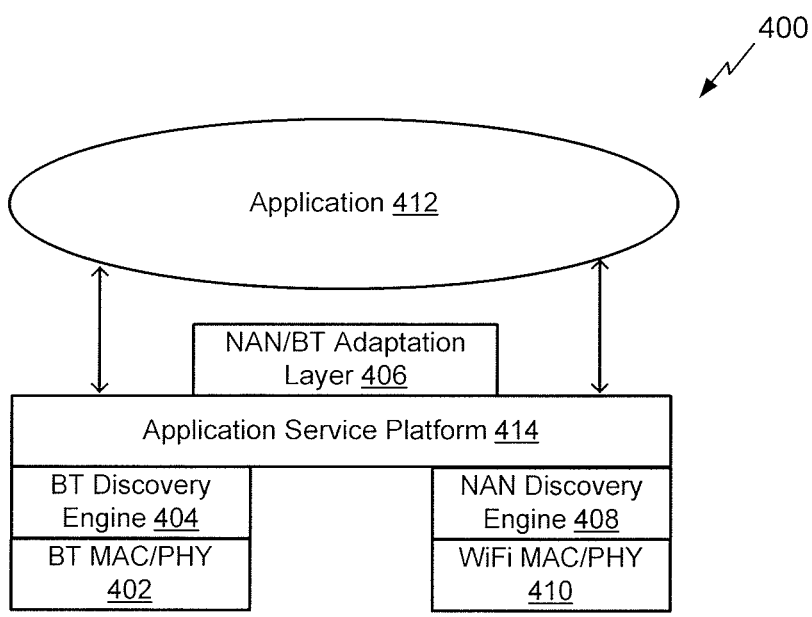
FIG. 4 shows another exemplary functional block diagram of an apparatus for integrating Bluetooth devices into neighbor aware networks, in accordance with an implementation.

FIG. 4 shows an exemplary functional block diagram of an apparatus 400 for integrating Bluetooth devices into neighbor aware networks, in accordance with an implementation. The apparatus 400 may correspond to the wireless device 200 of FIG. 2 and/or any of the WB STAs 104a-104b of FIG. 1. The apparatus 400 may comprise a BT MAC/PHY layer module 402, a BT Discovery Engine 404, a WiFi MAC/PHY layer module 410, and a NAN Discovery Engine 408, each corresponding to the BT MAC/PHY layer module 302, the BT Discovery Engine 304, the WiFi MAC/PHY layer module 310 and the NAN Discovery Engine 308 of FIG. 3, respectively. The apparatus 400 may additionally include an application services platform (ASP) 414, which may comprise a generic protocol layer that may communicate with both the BT portion (402/404) and the WiFi portion (408/410). The apparatus 400 may further comprise a NAN/BT adaptation layer 406, which may be configured to adapt and/or repackage communications received from the Bluetooth medium for retransmission over the WiFi medium, or vice versa, as previously described in connection with FIG. 1. The apparatus may also comprise an application 412 corresponding to application 312 of FIG. 3 with the exception that the application 412 need not operate with an awareness of the MAC/PHY layers for both of the BT and NAN portions, since the application 412 may communicate with the ASP 414.

Figure 5:
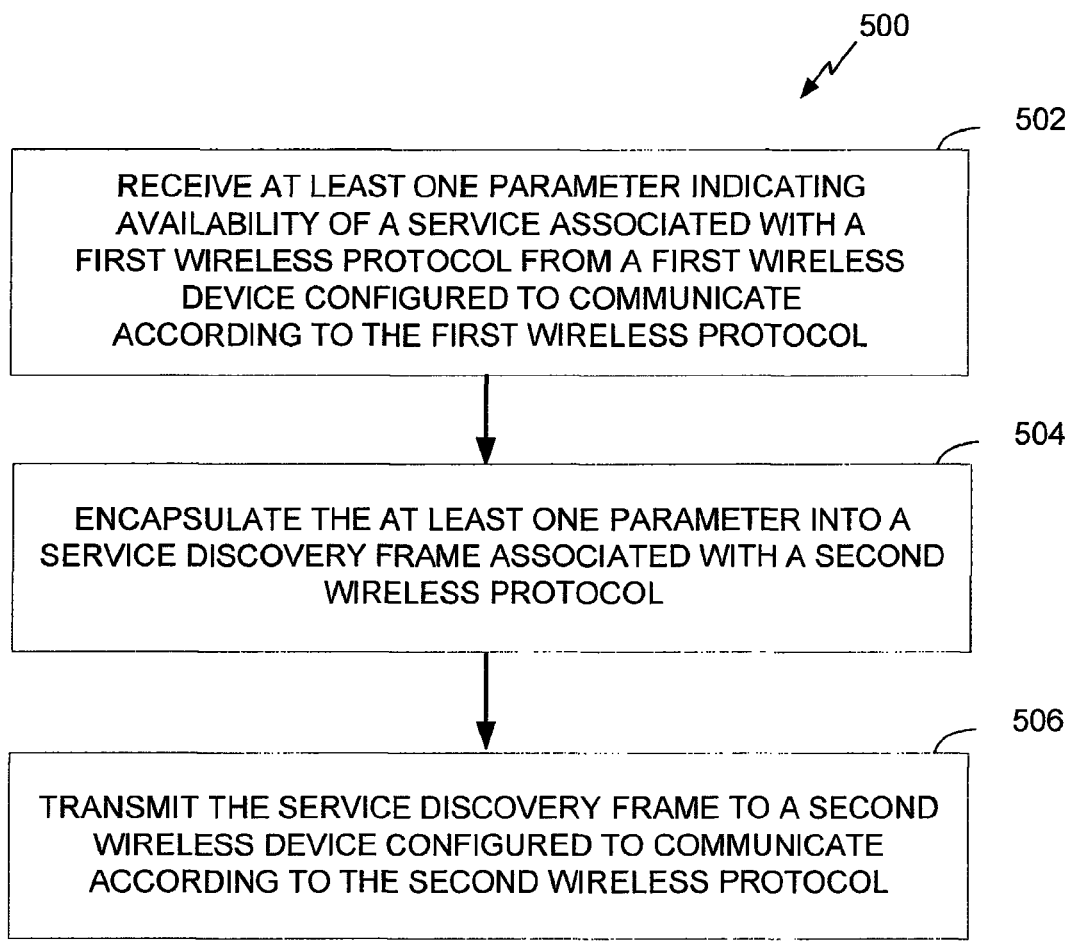
FIG. 5 shows a flowchart of a process for integrating Bluetooth devices into neighbor aware networks, in accordance with an implementation.

FIG. 5 shows a flowchart 500 of a process for integrating Bluetooth devices into neighbor aware networks, in accordance with an implementation. The method of flowchart 500 is described herein with reference to FIGS. 1 through 4. In one implementation, one or more of the steps in flowchart 500 may be performed by, or in connection with, a processor, memory, receiver, and/or transmitter, such as the processor 204, the memory 206, the receiver 212 and the transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

The method may begin with block 502, which includes receiving at least one parameter indicating availability of a service associated with a first wireless protocol from a first wireless device configured to communicate according to the first wireless protocol. For example, as previously described in the "Advertising Bluetooth Services Over a WiFi NAN" section in connection with FIG. 1, the at least one parameter may comprise service advertisement(s) according to a Bluetooth service discovery protocol.

The method may continue with block 504, which includes encapsulating the at least one parameter into a service discovery frame associated with a second wireless protocol. For example, as previously described in the "Advertising Bluetooth Services Over a WiFi NAN" section in connection with FIG. 1, the service discovery frame may comprise a NAN service discovery frame. In addition, the encapsulating may comprise providing a service ID field, and optionally, a separate service info field in a service description attribute of the NAN service discovery frame as previously described.

The method may continue with block 506, which includes transmitting the service discovery frame to a second wireless device configured to communicate according to the second wireless protocol. As previously described in connection with FIG. 1, the NAN service discovery frame, including the Bluetooth service information, may be transmitted via 802.11-based (WiFi) frames to one or more wireless devices in the NAN 100.

Figure 6:
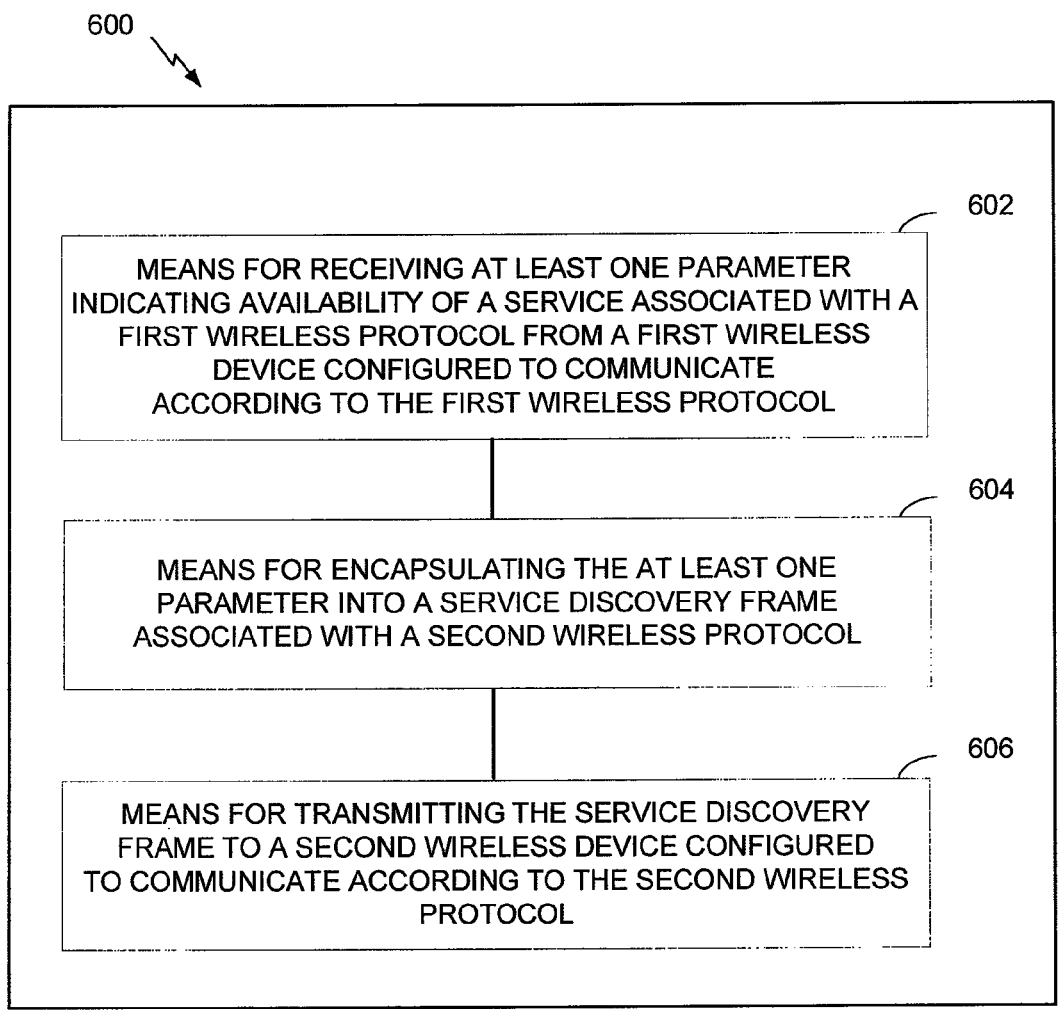
FIG. 6 shows an exemplary functional block diagram of an apparatus for integrating Bluetooth devices into neighbor aware networks, in accordance with an implementation.

FIG. 6 shows an exemplary functional block diagram of an apparatus 600 for integrating Bluetooth devices into neighbor aware networks, in accordance with an implementation. Those skilled in the art will appreciate that such an exemplary device may have more components than the simplified apparatus 600 shown in FIG. 6. The apparatus 600 shown includes only those components useful for describing some prominent features of implementations within the scope of the claims.

The apparatus 600 includes means 602 for receiving at least one parameter indicating availability of a service associated with a first wireless protocol from a first wireless device configured to communicate according to the first wireless protocol. In an implementation, the means 602 can be configured to perform one or more of the functions described above with respect to block 502 (FIG. 5). The means 602 may comprise at least the receiver 212 of the wireless device 202 as shown in FIG. 2, for example.

The apparatus 600 further includes means 604 for encapsulating the at least one parameter into a service discovery frame associated with a second wireless protocol. In an implementation, the means 604 can be configured to perform one or more of the functions described above with respect to block 504 (FIG. 5). The means 604 may comprise at least the processor 204 of the wireless device 202 as shown in FIG. 2, for example.

The apparatus 600 further includes means 606 for transmitting the service discovery frame to a second wireless device configured to communicate according to the second wireless protocol. In an implementation, the means 606 can be configured to perform one or more of the functions described above with respect to block 506 (FIG. 5). The means 606 may comprise at least the transmitter 210 of the wireless device 202 as shown in FIG. 2, for example, but may additionally include the processor 204.

Figure 7:
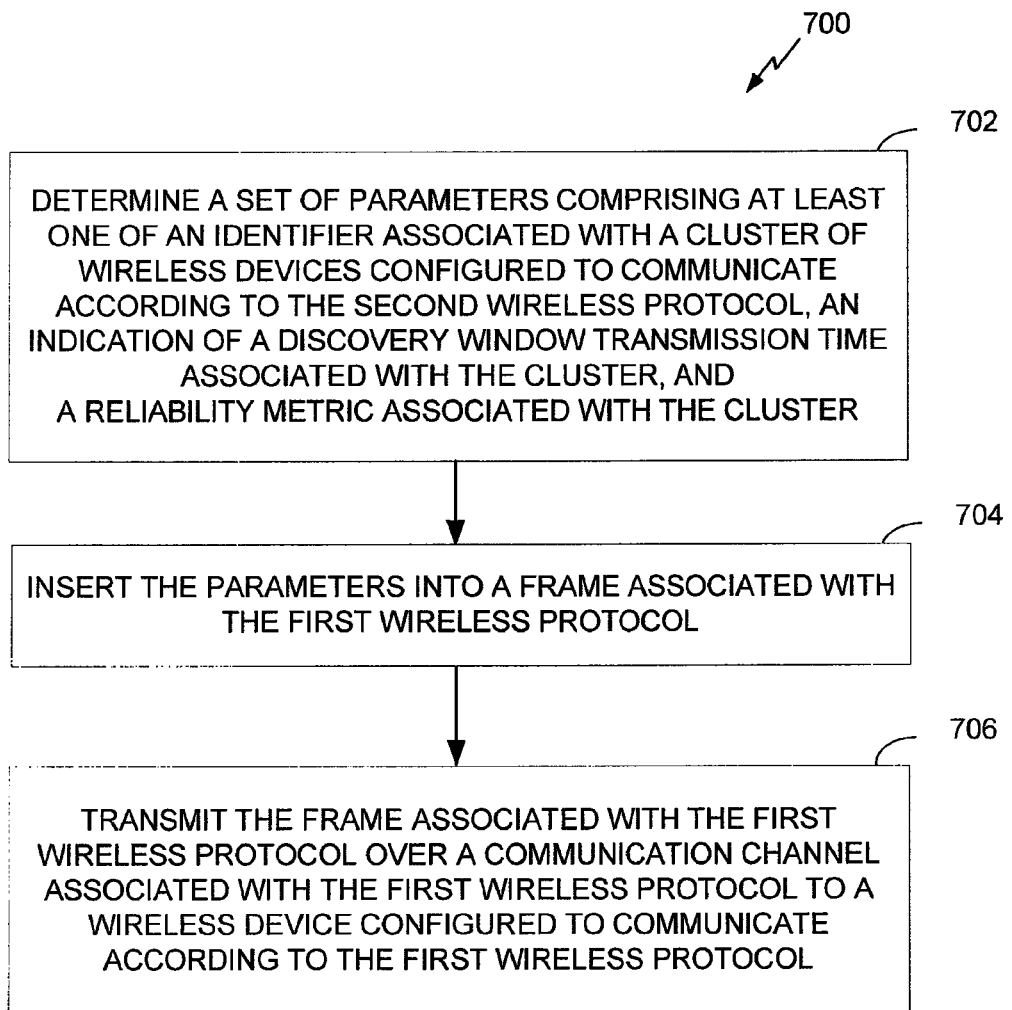
FIG. 7 shows a flowchart of another process for integrating Bluetooth devices into neighbor aware networks, in accordance with an implementation.

FIG. 7 shows a flowchart 700 of a process for integrating Bluetooth devices into neighbor aware networks, in accordance with an implementation. The method of flowchart 700 is described herein with reference to FIGS. 1 through 4. In one implementation, one or more of the steps in flowchart 700 may be performed by, or in connection with, a processor, a memory, a receiver, and/or transmitter, such as the processor 204, the memory 206, the receiver 212 and the transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added. Moreover, the blocks of flowchart 700 may be considered as either a continuation of the flowchart 500 of FIG. 5 or, alternatively, as a stand-alone method, depending on the implementation.

The method may begin with block 702, which includes determining a set of parameters comprising at least one of an identifier associated with a cluster of one or more wireless devices configured to communicate according to the second wireless protocol, an indication of a discovery window transmission time associated with the cluster, and a reliability metric associated with the cluster. For example, as previously described in the "Discovering a NAN and NAN Services over Bluetooth" section in connection with FIG. 1, a set of key NAN parameters may be compressed before being communicated over the BT/BTLE interface. Exemplary parameters may include a Cluster Identifier, a discovery window transmission time, and an Anchor Master Rank (which may be used to rate the strength, reliability or desirability of a particular data path through the NAN in the case of data path merge decisions).

The method may continue with block 704, which includes inserting the parameters into a frame associated with the first wireless protocol. As previously described, the parameters may be carried in a Bluetooth frame (e.g., the frame associated with the first wireless protocol) to the appropriate BT STAs 106a-106c.

The method may continue with block 706, which includes transmitting the frame associated with the first wireless protocol over a communication channel associated with the first wireless protocol to a wireless device configured to communicate according to the first wireless protocol. As previously described, this frame may be a Bluetooth frame and may be transmitted to a Bluetooth device over a Bluetooth communication channel.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
   receiving at least one parameter indicating availability of a service associated with a first wireless protocol from a first wireless device configured to communicate according to the first wireless protocol;
   encapsulating the at least one parameter into a service discovery frame associated with a second wireless protocol;
   transmitting the service discovery frame to a second wireless device configured to communicate according to the second wireless protocol; and
   caching the at least one parameter for a predetermined period of time and proceeding with encapsulating and transmitting when a query for the available service is received within the predetermined period of time from another wireless device configured to communicate according to the second wireless protocol.

2. The method of claim 1, wherein encapsulating comprises inserting at least one of:
   an address of the first wireless device into the service discovery frame; and
   a service identification field into a service description attribute of the service discovery frame.

3. The method of claim 2, wherein encapsulating further comprises inserting at least one of an indication of the available service or a hash of the indication of the available service into a service information field of the service description attribute.

4. The method of claim 1, further comprising:
   receiving a data packet associated with the available service from the first wireless device;
   prepending a header to the data packet, the header comprising a protocol identification indicating the wireless device configured to communicate according to the first wireless protocol; and
   transmitting the data packet having the prepended header to the second wireless device configured to communicate according to the second wireless protocol.

5. The method of claim 4, wherein the header comprises one of a logical link control header and a standard network access protocol header.

6. The method of claim 1, comprising
   determining a set of parameters comprising at least one of an identifier associated with a cluster of wireless devices configured to communicate according to the second wireless protocol, an indication of a discovery window transmission time associated with the cluster, and a reliability metric associated with the cluster;
   inserting the set of parameters into a frame associated with the first wireless protocol; and
   transmitting the frame associated with the first wireless protocol over a communication channel associated with the first wireless protocol to a wireless device configured to communicate according to the first wireless protocol.

7. The method of claim 1, wherein the first wireless protocol comprises a Bluetooth protocol and the second wireless protocol comprises a WiFi protocol.

8. The method of claim 1, wherein the second wireless device configured to communicate according to the second wireless protocol is associated with a neighbor aware network.

9. An apparatus for wireless communication, comprising:
   a receiver configured to receive at least one parameter indicating availability of a service associated with a first wireless protocol from a first wireless device configured to communicate according to the first wireless protocol;
   a processor configured to encapsulate the at least one parameter into a service discovery frame associated with a second wireless protocol; and
   a transmitter configured to transmit the service discovery frame to a second wireless device configured to communicate according to the second wireless protocol; and
   a memory configured to cache the at least one parameter for a predetermined period of time, the processor configured to proceed with encapsulating and the transmitter configured to proceed with the transmitting when a query for the available service is received within the predetermined period of time from another wireless device configured to communicate according to the second wireless protocol.

10. The apparatus of claim 9, wherein the processor is configured to insert at least one of:
an address of the first wireless device into the service discovery frame; and
a service identification field into a service description attribute of the service discovery frame.

11. The apparatus of claim 10, wherein the processor is configured to insert at least one of an indication of the available service or a hash of the indication of the available service into a service information field of the service description attribute.

12. The apparatus of claim 9, wherein:
the receiver is configured to receive a data packet associated with the available service from the first wireless device;
the processor is configured to prepend a header to the data packet, the header including a protocol identification indicating the wireless device configured to communicate according to the first wireless protocol; and
the transmitter is configured to transmit the data packet having the prepended header to the second wireless device configured to communicate according to the second wireless protocol.

13. The apparatus of claim 12, wherein the header comprises one of a logical link control header and a standard network access protocol header.

14. The apparatus of claim 9, wherein:
the processor is configured to:
determine a set of parameters comprising at least one of an identifier associated with a cluster of wireless devices configured to communicate according to the second wireless protocol, an indication of a discovery window transmission time associated with the cluster, and a reliability metric associated with the cluster;
insert the parameters into a frame associated with the first wireless protocol; and
the transmitter is configured to transmit the frame associated with the first wireless protocol over a communication channel associated with the first wireless protocol to a wireless device configured to communicate according to the first wireless protocol.

15. The apparatus of claim 9, wherein the first wireless protocol comprises a Bluetooth protocol and the second wireless protocol comprises a WiFi protocol.

16. The apparatus of claim 9, wherein the apparatus is associated with a neighbor aware network.

17. A non-transitory computer-readable medium comprising code that, when executed, causes an apparatus to:
receive at least one parameter indicating availability of a service associated with a first wireless protocol from a first wireless device configured to communicate according to the first wireless protocol;
encapsulate the at least one parameter into a service discovery frame associated with a second wireless protocol;
transmit the service discovery frame to a second wireless device configured to communicate according to the second wireless protocol; and
cache the at least one parameter for a predetermined period of time and proceed with encapsulating and transmitting when a query for the available service is received within the predetermined period of time from another wireless device configured to communicate according to the second wireless protocol.

18. The non-transitory computer-readable medium of claim 17, wherein the code, when executed, further causes the apparatus to encapsulate the at least one parameter based on inserting at least one of:
an address of the first wireless device service into the service discovery frame; and
a service identification field into a service description attribute of the service discovery frame.

19. The non-transitory computer-readable medium of claim 18, wherein the code, when executed, further causes the apparatus to encapsulate the at least one parameter based on inserting at least one of an indication of the available service and a hash of the indication of the available service into a service information field of the service description attribute.

20. The non-transitory computer-readable medium of claim 17, wherein the code, when executed, further causes the apparatus to:
receive a data packet associated with the available service from the first wireless device;
prepending a header to the data packet, the header comprising a protocol identification indicating the wireless device configured to communicate according to the first wireless protocol; and
transmit the data packet having the prepended header to the second wireless device configured to communicate according to the second wireless protocol.

21. The non-transitory computer-readable medium of claim 20, wherein the header comprises one of a logical link control header and a standard network access protocol header.

22. An apparatus for wireless communication, comprising:
means for receiving at least one parameter indicating availability of a service associated with a first wireless protocol from a first wireless device configured to communicate according to the first wireless protocol;
means for encapsulating the at least one parameter into a service discovery frame associated with a second wireless protocol;
means for transmitting the service discovery frame to a second wireless device configured to communicate according to the second wireless protocol; and
means for caching the at least one parameter for a predetermined period of time, wherein the means for encapsulating is configured to proceed with encapsulating and the means for transmitting is configured to proceed with transmitting when a query for the available service is received within the predetermined period of time from another wireless device configured to communicate according to the second wireless protocol.

23. The apparatus of claim 22, wherein the means for encapsulating comprises means for inserting at least one of:
an address of the first wireless device into the service discovery frame;
a service identification field into a service description attribute of the service discovery frame.

24. The apparatus of claim 23, wherein the means for encapsulating comprises means for inserting at least one of an indication of the available service and a hash of the indication of the available service into a service information field of the service description attribute.

25. The apparatus of claim 22, further comprising:
means for receiving a data packet associated with the available service from the first wireless device;
means for prepending a header to the data packet, the header including a protocol identification indicating the wireless device configured to communicate according to the first wireless protocol; and
means for transmitting the data packet having the prepended header to the second wireless device configured to communicate according to the second wireless protocol.

26. The apparatus of claim 25, wherein the header comprises one of a logical link control header and a standard network access protocol header.

* * * * *